US011882023B2

(12) United States Patent
Drusinsky et al.

(10) Patent No.: US 11,882,023 B2
(45) Date of Patent: Jan. 23, 2024

(54) METHODS AND SYSTEMS FOR MULTIAGENT PATHFINDING

(71) Applicant: THE UNITED STATES OF AMERICA, AS REPRESENTED BY THE SECRETARY OF THE NAVY, Arlington, VA (US)

(72) Inventors: Doron Drusinsky, Cupertino, CA (US); James Bret Michael, Pebble Beach, CA (US)

(73) Assignee: The Government of the United States of America, represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 18/076,807

(22) Filed: Dec. 7, 2022

(65) Prior Publication Data
US 2023/0179512 A1    Jun. 8, 2023

Related U.S. Application Data

(60) Provisional application No. 63/286,880, filed on Dec. 7, 2021.

(51) Int. Cl.
*H04L 45/24* (2022.01)
*H04L 45/12* (2022.01)

(52) U.S. Cl.
CPC ............ *H04L 45/24* (2013.01); *H04L 45/123* (2013.01)

(58) Field of Classification Search
None
See application file for complete search history.

(56) References Cited

U.S. PATENT DOCUMENTS

| 11,561,107 B2* | 1/2023 | Magzimof | H04W 8/08 |
| 2017/0069214 A1* | 3/2017 | Dupray | G08G 5/0008 |
| 2018/0172450 A1* | 6/2018 | Lalonde | G01C 21/3407 |
| 2021/0297453 A1* | 9/2021 | Crabtree | G06F 16/951 |

* cited by examiner

*Primary Examiner* — Mohamed Ibrahim
(74) *Attorney, Agent, or Firm* — Naval Postgraduate School; Scott Bell

(57) ABSTRACT

Methods, and systems, for Multiagent Pathfinding for Non Dynamic Programming Problems, including a CE method which provides for sampling from a complex probability distribution that is not necessarily known in a closed form. The applications of this method include rare-event simulation, variance reduction for estimation problems, and stochastic optimization. The method iteratively searches for a probability distribution that is "close" to the intended distribution, where the closeness of distributions is measured using the Kullback-Liebler (KL) divergence between the distributions. At each step, the method generates samples according to a current candidate distribution from the family. Next, it uses those current candidate distribution samples to move the distribution toward a new candidate distribution that is closer in the sense of KL divergence to the target distribution.

20 Claims, 4 Drawing Sheets
(1 of 4 Drawing Sheet(s) Filed in Color)

METHODS AND SYSTEMS FOR MULTIAGENT PATHFINDING

CROSS REFERENCE TO RELATED PATENT(S) AND APPLICATION(S)

This application claims the benefit of U.S. Provisional Application No. 63/286,880, filed Dec. 7, 2021, and entitled Multiagent Pathfinding for Non Dynamic Programming Problems, which is hereby incorporated in its entirety by reference.

BACKGROUND

This disclosure, and the exemplary embodiments described herein, describe methods and systems for multi-agent pathfinding associated with a domain-of-discourse The implementation described herein is related to a multi-agent/vehicle routing application, however it is to be understood that the scope of this disclosure is not limited to such application.

Many contemporary navigation applications rely on the well-known A* algorithm for pathfinding. Disclosed herein is a pathfinding technique utilizing a cross-entropy method and probabilistic models (such as Bayesian Networks or Hidden Markov Models) that is capable of finding paths for multiple agents while satisfying rigid, optimization, and uncertainty constraints.

Pathfinding is such a commonplace task that it has become a standard feature in navigation applications for mobile devices. This disclosure, and the exemplary embodiments disclosed herein, reshape the algorithmic approach to solving the path-finding problem, and illustrate how the disclosed technique(s) addresses the added complexity introduced by simultaneously factoring in rigid, optimization, and uncertainty constraints for systems of collaborating agents.

This disclosure and the exemplary embodiments described herein, includes Methods and Systems Multiagent Pathfinding using algorithms free of the limitations of Dynamic Programming algorithms.

INCORPORATION BY REFERENCE

The following publications are incorporated by reference in their entirety.

H. Auer and T. Perger, "Energy efficient route planning for electric vehicles with special consideration of the topography and battery lifetime," Energy Efficiency, vol. 13, no. 8, pp. 1705-1726, 2020.

C. R. Rao and V. Govindaraju, Eds., "Machine learning: Theory and applications," in Handbook of Statistics, vol. 31. Amsterdam: North Holland, 2013.

T. H. Cormen, C. E. Leiserson, R. L. Rivest, and C. Stein, Introduction to Algorithms, 3rd ed. Cambridge, Mass.: MIT Press, 2009.

J. L. Eddeland, A. Donzé, S. Miremadi, and K. Akesso, "Industrial temporal logic specifications for falsification of cyber-physical systems," in Proc. 7th Int. Workshop on Applied Verification of Continuous and Hybrid Systems, EPiC Series in Computing, vol. 74, pp. 267-274, 2020.

T. Homem-de-Mello and R. Y. Rubinstein, "Rare event simulation and combinatorial optimization using cross entropy: estimation of rare event probabilities using cross-entropy," in Proc. Winter Simulation Conf., pp. 310-319, 2002.

R. Y. Rubinstein and D. P. Kroese, The Cross-Entropy Method: A Unified Approach to Combinatorial Optimization, Monte-Carlo Simulation and Machine Learning, Springer, New York, 2004.

BRIEF DESCRIPTION

In accordance with one embodiment of the present disclosure, disclosed is a method for multiagent pathfinding associated with a domain-of-discourse, the method comprising: generating a transition matrix that is n by m, wherein n is a grid size of a domain-of-discourse and m is a number of possible actions taken for a next step from a given step, and wherein the domain-of-discourse is associated with a geographic area; generating N potential sample paths in the domain-of-discourse for each of a plurality of agents, the potential paths associated with an initial agent location and a range of potential final destinations wherein N is typically larger than n; evaluating each potential path with a custom score function to generate a score value for each potential path, the score including a combination of a rigid constraint score, an optimization constraint score, an uncertainty constraint score and an inter-agent constraint score that represents a corresponding potential path's relationship with paths that were computed for other agents; ranking the potential paths by the generated score values, the highest ranked potential paths associated with lower value scores; updating the transition matrix, for all agents, using probability values induced by the highest (elite) ranked paths of the potential paths; in response to iteratively evaluating the highest ranked paths until a designated high ranked path score value remains unchanged for a predetermined number of iterations, declaring a highest ranked path of the highest ranked paths, for each agent, as an optimal path; and using the optimal path to navigate a vehicle or any other object associated with each agent along the highest ranked paths.

In accordance with another embodiment of the present disclosure, disclosed is a system for multiagent pathfinding associated with a domain-of-discourse, the system comprising: a transition matrix generator module generating a transition matrix that is n by m, wherein n is a grid size of a domain-of-discourse and m is a number of possible actions taken for a next step from a given step, and wherein the domain-of-discourse is associated with a geographic area; a potential path generator module generating N potential paths in the domain-of-discourse for each of a plurality of agents, the potential paths associated with an initial agent location and a range of potential final destinations wherein N is typically larger than n; an evaluator module evaluating each potential path with a custom score function to generate a score value for each potential path, the score including a combination of a rigid constraint score, an optimization constraint score, an uncertainty constraint score and an inter-agent constraint score that represents a corresponding potential path's relationship with paths that were computed for other agents; a ranker module ranking the potential paths by the generated score values, the highest ranked potential paths associated with lower value scores; an updater module updating the transition matrix, for all agents, with probability values induced by the highest (elite) ranked paths of the potential paths; in response to iteratively evaluating the highest ranked paths until a designated highest ranked path score value remains unchanged for a predetermined number of iterations, declaring a highest ranked path of the highest ranked paths, for each agent, as an optimal path; and an optimal path communication device communicating the optimal path to each agent to navigate a vehicle associated with each agent along the highest ranked paths.

In accordance with another embodiment of the present disclosure, disclosed is a system for multiagent pathfinding associated with a domain-of-discourse, the system comprising: a transition matrix generator module generating a transition matrix that is n by m, wherein n is a grid size of a domain-of-discourse and m is a number of possible actions taken for a next step from a given step, and wherein the domain-of-discourse is associated with a geographic area; a potential path generator module generating N potential paths in the domain-of-discourse for each of a plurality of agents, the potential paths associated with an initial agent location and a range of potential final destinations wherein N is typically larger than n; an evaluator module evaluating each potential path with a custom score function to generate a score value for each potential path, the score including a combination of a rigid constraint score, an optimization constraint score, an uncertainty constraint score and an inter-agent constraint score that represents a corresponding potential path's relationship with paths that were computed for other agents; a ranker module ranking the potential paths by the generated score values, the highest ranked potential paths associated with lower value scores; an updater module updating the transition matrix, for all agents, with probability values induced by the highest (elite) ranked paths of the potential paths; in response to iteratively evaluating the highest ranked paths until the highest ranked path score values remain unchanged for a predetermined number of iterations, declaring a highest ranked path of the highest ranked paths, for each agent, as an optimal path; and an optimal path communication device communicating the optimal path to each agent to navigate a vehicle associated with each agent along the highest ranked paths, wherein the score for each potential path comprises: rigid constraint scores that represent the corresponding potential path's ability to satisfy strict requirements; optimization constraint scores that represent the corresponding potential path's ability to satisfy routing preferences; uncertainty constraint scores that represent the corresponding potential path's ability to satisfy conditional probabilities; and inter-agent constraint scores that represent the corresponding potential path's relationship with paths that were computed for other agents in the previous round; and wherein the system performs Cross-Entropy optimization.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present disclosure, reference is now made to the following descriptions taken in conjunction with the accompanying drawings.

DETAILED DESCRIPTION

Figure 1:
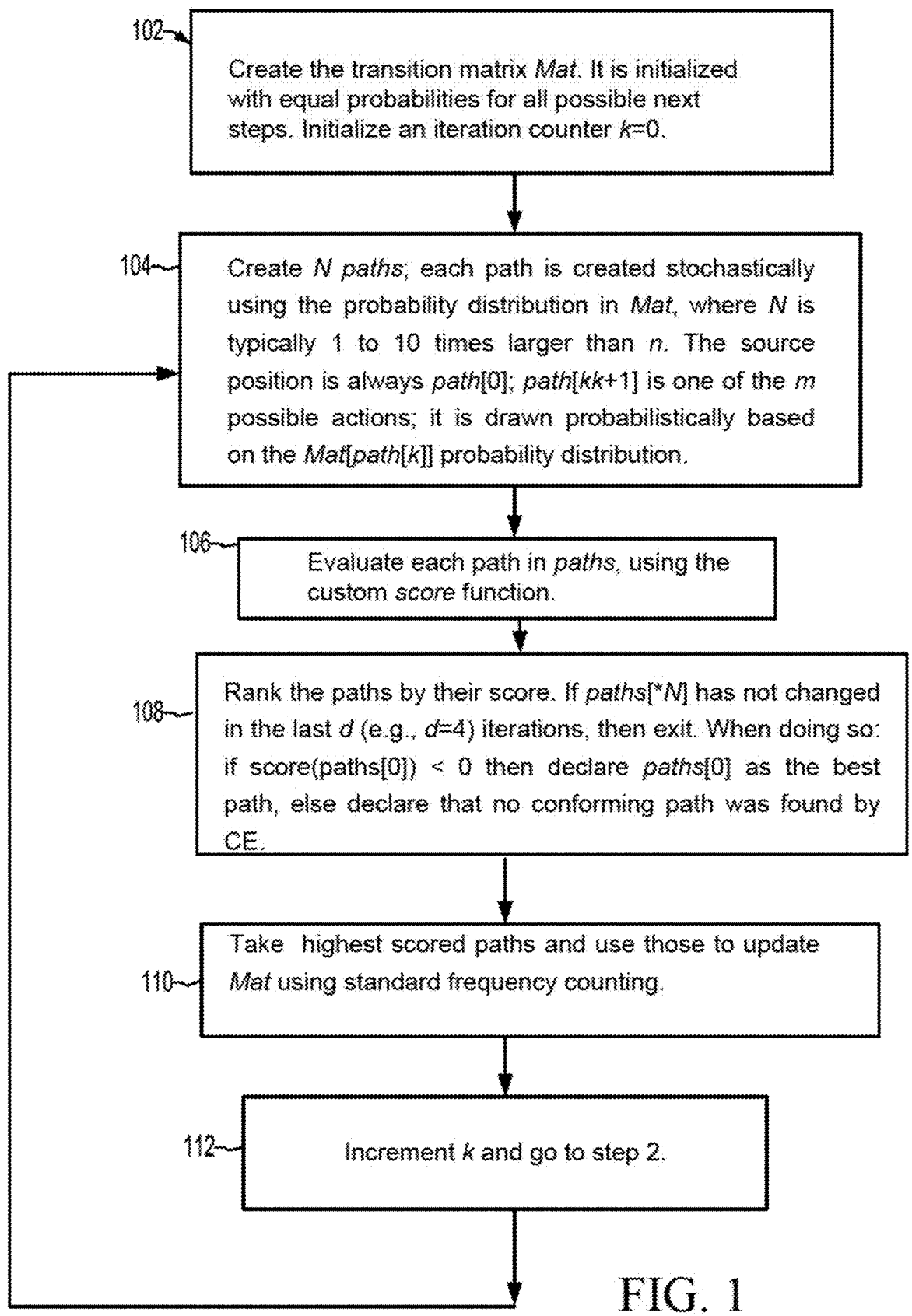
FIG. 1 shows a flow chart of a method for multiagent pathfinding associated with a domain-of-discourse according to an exemplary embodiment of this disclosure.

This disclosure and exemplary embodiments described herein provide methods and systems for Multiagent Pathfinding for Non Dynamic Programming Problem.

The disclosed novel process addresses a general pathfinding problem, where given a domain of discourse as a graph or a continuous n-dimensional (n=2 or 3, etc.) map, find an optimal path subject to various constraints.

With path planning, optimization and constraints relate to the path, not the entity, such as a manually driven vehicle or unmanned autonomous vehicle (UAV), traversing, or attempting to traverse paths. Motion planning, on the other hand, is concerned with the dynamic control of the objects as well, such as a UAV. In this article, we focus on path planning.

With most conventional route-finding applications, the map is modeled as a weighted graph, and the algorithm being used is a variant of a single-source shortest path (SSSP), which, in turn, is a variant of a breadth-first search augmented with a priority queue. See T. H. Cormen, C. E. Leiserson, R. L. Rivest, and C. Stein, Introduction to Algorithms, 3rd ed., The MIT Press, Cambridge, Mass., 2009. Such vanilla SSSP solutions are inefficient for most route finding applications because they explore the entire graph, that is, they discover a shortest path tree starting with the source node and spanning the entire graph. Route-finding algorithms used in contemporary applications, such as A*, which is an extension of Dijkstra's classical SSSP algorithm (See E. W. Dijkstra, "A note on two problems in connexion with graphs," Numerische Mathematik, vol. 1, pp. 269-271, 1959.) are tailored so that, in most cases, they do not explore the entire graph. A* uses a heuristic approximation of the distance/cost h between the current node and the destination. A* is optimal, finding the shortest path from the source to the destination as long as the h metric is admissible (that is, it does not overestimate the cost).

Present-day route-finding applications add features to the basic SSSP algorithm, such as: 1) allowing stops along the route, which is usually accomplished by breaking the route-searching tasks into smaller route searching paths, one per segment; 2) limiting the chosen path, such as restricting that path to city streets rather than highways, which is usually accomplished by restricting the underlying graph; and 3) factoring in traffic and weather conditions based on real-time and historical data.

A* is tailored for problems with an optimal substructure property, namely, problems for which the optimal solution for a problem of any size necessarily contains within it an optimal solution to a subproblem; the optimal substructure property is a necessary condition for all dynamic programming like algorithms. Hence, for example, the shortest distance from the start to the end necessarily contains, as a subpath, the shortest distance from the start to the vertex prior to the end. A counterexample is as follows. Using a 200-mile fuel budget and searching for the shortest path to a destination 500 miles away, the shortest path does not necessarily contain in it a shortest path between locations that are 100 miles apart. The longer path must contain an open fueling station, whereas the shorter ones do not. A* relies on the optimal substructure property because the algorithm works bottom up, i.e., from the beginning of the route to its end (or vice versa).

In contrast, disclosed herein is a pathfinding algorithm that does not need to satisfy an optimal substructure property and can therefore solve problems like the 500-mile trip described previously. Moreover, it can balance a plurality of such constraints and solve constraints that apply across a fleet of vehicles while satisfying a large set of rigid and optimization constraints. However, it is to be understood that while a real time application is possible, the disclosed algorithm is much slower than A* and may not be appropriate for a real time application.

Yen's shortest path algorithm computes single-source K-shortest paths for a graph with nonnegative edge cost. See J. Y. Yen, "An algorithm for finding shortest routes from all source nodes to a given destination in general networks," Quart. Appl. Math., vol. 27, no. 4, pp. 526-530, 1970. It uses Dijkstra's algorithm as a subroutine. The algorithms of Auer et al. (See H. Auer and T. Perger, "Energy efficient route planning for electric vehicles with special consideration of the topography and battery lifetime," Energy Efficiency, vol. 13, pp. 1705-1726, 2020.) support energy-efficient pathfinding with obvious electric vehicle applications. As derivatives of Dijkstra's algorithm, these algorithms are also subject to the optimal substructure limitation.

The Bellman-Ford algorithm computes the shortest paths from a single source vertex to all of the other vertices in a weighted graph. See J. Bang-Jensen and G. Gutin, "Section 2.3.4: The Bellman-Ford-Moore algorithm," in Digraphs: Theory, Algorithms, and Applications, 1st ed., Springer-Verlag, Berlin, pp. 55-58, 2000. It is slower than Dijkstra's algorithm and definitely slower than A* because it observes every edge in the graph. It can, however, perform SSSP in graphs with negative weights. This algorithm is also subject to the optimal substructure constraint.

Rapidly exploring random tree (RRT) grows a path tree rooted at the starting configuration by using random samples from the search space. S. M. LaValle and J. J. Kuffner, "Randomized kinodynamic planning," Int. J. Robot. Res., vol. 20, no. 3, pp. 378-400, 2001. As each sample is drawn, a connection is attempted. However, RTT's only objective is finding a collision-free path to a goal region.

The multiagent pathfinding problem (MAPF) is as follows: given a set of agents, each with respective start and goal positions, find paths for all agents while avoiding collisions. Simply applying A* to all agents while attempting to avoid conflicts results in an exponential time (in the number of agents) algorithm. The conflict-based search (CBS) algorithm solves the MAPF by applying A* in a top-down manner on varying abstractions of the map, all while operating on a conflict tree to manage conflicts. See G. Sharon, R. Stern, A. Felner, and N. R. Sturtevant, "Conflict-based search for optimal multi-agent pathfinding," Artificial Intelligence, vol. 219, pp. 40-66, 2015, and] G. Sharon, R. Stern, A. Felner, and N. R. Sturtevant, "The increasing cost tree search for optimal multi-agent pathfinding," Artificial Intelligence, vol. 195, pp. 470-495, 2013. Hence, as with all A* applications, CBS is limited by the optimal substructure property. In addition, it is hardwired to solve very particular interagent constraints, such as node or path collisions. As evident from a running example including shipping vehicles with complex constraints presented herein and discussed further below, interesting interagent constraints might allow such collisions yet strive to optimize other constraints without having to develop a new algorithm for each new type of constraint.

Model checking (MC) is a formal verification technique for proving or disproving the correctness of a formal specification correctness property with respect to the behavior of an underlying model. MC has been applied to the verification of artificial intelligence planning software, including path planning. See S. Bensalem, K. Havelund, and A. Orlandini, "Verification and validation meet planning and scheduling," Int. J. Softw. Tools Technol. Transfer, vol. 16, no. 1, pp. 1-12, 2014, and K. Havelund, A. Groce, G. Holzmann, R. Joshi, and M. Smith, "Automated testing of planning models," in D. A. Peled and M. J. Wooldridge, eds., Model Checking and Artificial Intelligence, LNCS vol. 5348, Springer, Berlin, pp. 90-105, 2009. This approach can be extended to actual path planning by constructing a formal specification correctness property (p that asserts the constraints the desired path should conform to and then using MC to find a counterexample for (a path that disproves) $-\varphi$, that is, a path that conforms to $\varphi$.

Two limitations of the MC-based pathfinding approach are 1) the environment, where the map or chart in the form of a grid or graph must be rep-resented as a formal model, typically some sort of finite automaton, which induces an exponentially large model, and 2) the formal specification for the desired path is done using an expressively weak language, typically some variant of temporal logic (TL), such as propositional linear time TL, metric TL, or signal TL (STL). For instance, Cho et al. present a path-planning algorithm for cost-efficient path generation that satisfies the mission requirements specified in linear TL based on the RRT algorithm. See K. Cho, J. Suh, C. J. Tomlin, and S. Oh, "Cost-aware path planning under co-safe temporal logic specifications," in IEEE Robot. Autom. Lett., vol. 2, no. 4, pp. 2308-2315, 2017.

The pathfinding algorithm described herein represents the environment map as a grid or a graph. The constraints for the desired path are written as a score function in a conventional programming language such as Java; hence, any Turing-equivalent requirement can be coded as a constraint. The underlying algorithm used is cross-entropy (CE) optimization. See R. Y. Rubinstein and D. P. Kroese, The Cross-Entropy Method: A Unified Approach to Combinatorial Optimization, Monte-Carlo Simulation and Machine Learning, Springer, New York, 2004.

Prior published CE-based pathfinding approaches are as follows: Kuhlman et al. (See M. J. Kuhlman, D. Jones, D. A. Sofge, G. A. Hollinger and S. K. Gupta, "Collaborating underwater vehicles conducting large-scale geospatial tasks," IEEE J. Ocean. Eng., 2021.) applied CE to the path planning of collaborating autonomous underwater vehicles (AUVs) conducting large-scale geospatial tasks, focusing on path-dependent rewards such as maximizing the amount of area covered or sampling locations based on temperature. Li et al. (See Y. Li, R. Cui, D. Xu, and S. Liu, "Online informative path planning for autonomous underwater vehicles with cross entropy optimization," in Proc. 3rd Int. Conf. Advanced Robotics and Mechatronics, pp. 566-571, 2018.) applied CE to path planning with the goal of monitoring underwater phenomenon within some designated area; the path is predefined as a B-spline with CE being used to obtain optimal control points along that B-spline. Suh et al. (See J. Suh, J. Gong, and S. Oh, "Fast sampling-based cost-aware path planning with nonmyopic extensions using cross entropy," IEEE Trans. Robot., vol. 33, no. 6, pp. 1313-1326, 2017.) applied CE to the motion planning of robots performing environmental monitoring while at-tempting to avoid places where the environment is detrimental to the robot, such as areas of high radioactivity.

Tan et al. (See Y. T. Tan, A. Kunapareddy, and M. Kobilarov, "Gaussian process adaptive sampling using the cross-entropy method for environmental sensing and monitoring," in Proc. IEEE Int. Conf. Robotics and Automation, pp. 6220-6227, 2018.) applied CE as an adjunct to adaptive sampling on a Gaussian process (GP), with CE performing trajectory optimization, thereby enabling the GP sampling density to be dynamically adjusted based on the sensory measurements. Tang et al. (See Q. Tang, L. Ma, Y. Sun, G. Yang, Z. Li, and D. Zhao, "A heuristic path planning algorithm for inspection robots," in Proc. 39th Chinese Control Conf., pp. 3834-3839, 2020.) applied CE to the path planning of industrial inspection robots for finding the shortest path among the task (inspection) points; no other constraints were imposed. Zhang et al. (See L. Zhang, X. Tao, F. Zhang and Y. Yuan, "Multi AUVs cooperative navigation based on cross entropy," in Proc. Int. Conf. Control, Automation and Information Sciences, pp. 279-284, 2018.) applied CE as an adjunct to the Markov decision process (MDP) for the purpose of training a master AUV to select a better path in the MDP navigation model. All of the mentioned articles either perform pathfinding with no constraints or with constraints that conform to the optimal substructure property.

Machine learning has also been applied to the pathfinding problem as follows. Dijt and Meters used trajectory prediction networks for the future anticipation of ships by applying recurrent convolutional neural net-works, with the features being coordinates, radar images, and segmentation charts from previous observations. See P. Dijt and P. Mettes, "Trajectory prediction network for future anticipation of ships," in Proc. Int. Conf. on Multimedia Retrieval, pp. 73-81, 2020. Li et al. used graph neural networks (GNNs) for a decentralized path planning field of view constraints, where the output GNN generates local communication and decision-making policies for the agents. Sartoretti et al. applied distributed reinforcement learning to collaborative path learning in a 2D landscape with physical obstacles. See G. Sartoretti, J. Kerr, Y. Shi, G. Wagner, T. K. Kumar, S. Koenig, and H. Choset, "PRIMAL: Pathfinding via reinforcement and imitation multi-agent learning," IEEE Robot. Autom. Lett., vol. 4, no. 3, pp. 2378-2385, 2019.

CE is also used for falsification, a runtime verification technique using STL specifications often applied to cyber-physical systems. See J. L. Eddeland, A. Donze, S. Miremadi, and K. Akesso, "Industrial temporal logic specifications for falsification of cyber-physical systems," in Proc. 7th Int. Workshop Applied Verification of Continuous and Hybrid Systems, EPiC Series in Computing, vol. 74, pp. 267-274, 2020. With STL falsification, the CE score function is calculated recursively based on the structure of the STL formula being verified.

Described now is an overview of a CE method and a technique that underlines the disclosed search method. Then described is the running example including shipping vehicles with complex constraints and a score function that the CE method uses to find paths for multiple agents, i.e. vehicles, satisfying three types of constraints: rigid, optimization, and uncertainty constraints.

The CE method provides for sampling from a complex probability distribution that is not necessarily known in a closed form. The applications of this method include rare-event simulation, variance reduction for estimation problems, and stochastic optimization. See C. R. Rao and V. Govindaraju, eds. Machine Learning: Theory and Applications. In Handbook of Statistics, vol. 31, North Holland, Amsterdam, 2013 and T. Homem-de-Mello and R. Y. Rubinstein, "Rare event simulation and combinatorial optimization using cross entropy: estimation of rare event probabilities using cross-entropy," in Proc. Winter Simulation Conf., pp. 310-319, 2002. The method iteratively searches for a probability distribution that is "close" to the intended distribution, where the closeness of distributions is measured using the Kullback-Liebler (KL) divergence between the distributions. At each step, the method generates samples according to a current candidate distribution from the family. Next, it uses those current candidate distribution samples to move the distribution toward a new candidate distribution that is closer in the sense of KL divergence to the target distribution.

The algorithm uses a transition matrix called Mat, whose size is n*m, where m is the number of possible actions taken for step(k+1) given step(k). When using a 2D grid representation of the underlying domain-of-discourse map, then n is the size of the grid (width times height), and m=8 is used, meaning that the next location after the current step can be any one of the eight adjacent locations (that is, three above, three below, and the two sides of the current location). Using m=4, the adjacent locations are above, below, on the left, and on the right of the current location. It restricts the path planner to Manhattan routes. When using a 3D grid, n and m grow respectively. Using m=5, the adjacent locations are the above mentioned 8 adjacent locations excluding those moving down. Using m=3, the adjacent locations are the above mentioned 5 adjacent locations excluding those moving strictly left or strictly right.

Some 3D path-finding problems can be solved using a 2D grid by assigning categorical values to the cells of the grid to represent the type of obstacle, water depth, or any other category the pathfinder might consider. In this use case, paths are 2D, yet the constraints considered when searching for the best path are 3D.

Using a 2D or 3D grid is obviously not efficient space-wise, although it is sometimes well suited for applications in which the domain-of-discourse map and the search problem are inherently 2D or 3D with a variety of terrain categories, such as with maritime or open landscape applications. An alternative representation, applicable to road-based route finding, represents the roadmap as a graph $G=(V,E)$, where junctions become vertices and road segments between junctions become edges. Since real-world junctions connect only to a handful of road segments (for example, six at most), an adjacency list serves well as an efficient data structure. In this case, $n=|V|$ and $m=6$.

With reference to FIG. 1, shown is a flow chart of a method for multiagent pathfinding associated with a domain-of-discourse according to an exemplary embodiment of this disclosure. The essence of CE is the calculation of $Mat[i,Q]=p(step(k+1)=j|step(k)=i)$. Listing 1 below contains the pseudocode for the generic CE method.

Step 1. (102) Create the transition matrix Mat. It is initialized with equal probabilities for all possible next steps. Initialize an iteration counter k=0.

Step 2. (104) Create N paths; each path is created stochastically using the probability distribution in Mat, where N is typically 1 to 10 times larger than n. The source position is always path[0]; path[kk+1] is the outcome of one of the m possible actions taken at path[kk]; it is drawn probabilistically based on the Mat[path[k]] probability distribution. In other words, a path is constructed incrementally, starting at the source location; gives a path-prefix that has already been constructed, i.e., path[0], . . . , path[kk], path[kk+1] " . . . is one of the m possible actions; it is drawn probabilistically based on the Mat[path[k]] probability distribution.

Step 3. (106) Evaluate each path in paths, using the custom score function, CE's equivalent of a specification. A score less than zero means the path conforms to all rigid constraints, whereas a non-negative score value means the path is inadmissible. The lower the score, the more the path conforms to the governing optimization and uncertainty constraints. As a function in a standard programming language such as C, Java, or Python, the score function is Turing equivalent (i.e., can implement any computable specification).

Step 4. (108) Rank the paths by their score. If paths[υ*N] has not changed in the last d (e.g., d=4) iterations, then exit. When doing so: if score(paths[0])<0 then declare paths[0] as the best path, else declare that no conforming path was found by CE.

The variable υ is a small fraction such as 0.01.

Step 5. (110) Take υ highest scored paths (i.e., paths [0.υ*N−1], called elite paths) and use those to update Mat using standard frequency counting, that is, Mat[i,j]=number of times a path of paths[0.υ*N−1] stepped from location i to location j, divided by υ*N.

Step 6. (112) Increment k and go back to step 2.

Given that N can be as large as 10*n and that n can be large as well (many thousands of vertices), the paths array can be as large, inducing a heavy $N*lg(N)$ cost for sorting in step 6 of every iteration. To circumvent that, practical implementations only update and sort the best υ*N+1 paths.

When a 2D grid representation is used to represent the underlying map, for every obstacle location j and for every i, we force Mat[i,j]=0; this assures that no path will be created by CE where step(k+1)=j given step(k)=i, thereby relieving the score function from the responsibility of assuring that paths do not traverse through obstacles. When an adjacency list representation is used to represent the underlying map, then the mere existence of an edge i→j indicates that there is no obstacle along that road segment.

Running Example: Shipping Vehicles with Complex Constraints

The shipping example takes place in downtown San Francisco, with multiple shipping drop-off locations served by four shipping vehicles (A=4). All of the vehicles have the same start location and a certain range of possible final destinations. In addition to drop-off locations, there exists a set of possible pickup locations where the shipping company makes courtesy stops if the likelihood is greater than a certain threshold that such a location indeed has a pickup. Let L be the total number of designated drop-off and (potential) pickup locations. The CE problem is to discover A paths for the A shipping vehicles that need to be routed; those paths are subject to three primary types of constraints.

1. Rigid constraints. A path generated by the pathfinder must never violate such a constraint. Specifically, for this example, those constraints are as follows:

R1. Each vehicle has a designated start-of-route location, denoted as src, and an end-of-route location, dest.

R2. Each vehicle's route must go through at least $L_{R2}$= (L−12)/A locations of the L designated drop-off and pickup locations.

R3. Each of the L designated drop-off and pickup locations must be assigned to some vehicle. Paths that conform to rigid constraints are called admissible; others are inadmissible. The CE solver may only consider admissible paths.

2. Optimization constraints. The pathfinder strives to find paths that optimize these constraints. Specifically, for this example, those constraints are as follows:

O1. Vehicle routes should be as short as possible.

O2. Vehicles should prefer wide streets.

O3. Two vehicles should avoid, as much as possible, serving the same drop-off or pickup location. (This is not a rigid constraint because a set A of vehicle paths is admissible even if it violates this requirement. However, the optimization result worsens monotonically with an increased number of violations of O3.)

3. Uncertainty constraints. These are a special form of optimization constraints. Specifically, for this example, there is one such constraint, U1, as follows:

U1. While pickup locations are certain, it is uncertain which of those locations contain packages for pickup. Obviously, if the merchant gives prior notice of a pickup request, then that uncertainty is zero, but they often do not. The historical data of such unannounced pickups induce a "probability of (unannounced) pickup" measure for each pickup location, ploc, denoted as $p_{pickup}(ploc)$. In addition, the later the pickup location is reached during the route, the higher the probability of a pickup being required. For a given path, the value of stopping at a pickup location, denoted v(ploc), is, therefore, a combination of the product of $p_{pickup}(ploc)$ and the index ploc along the path.

Figure 2:
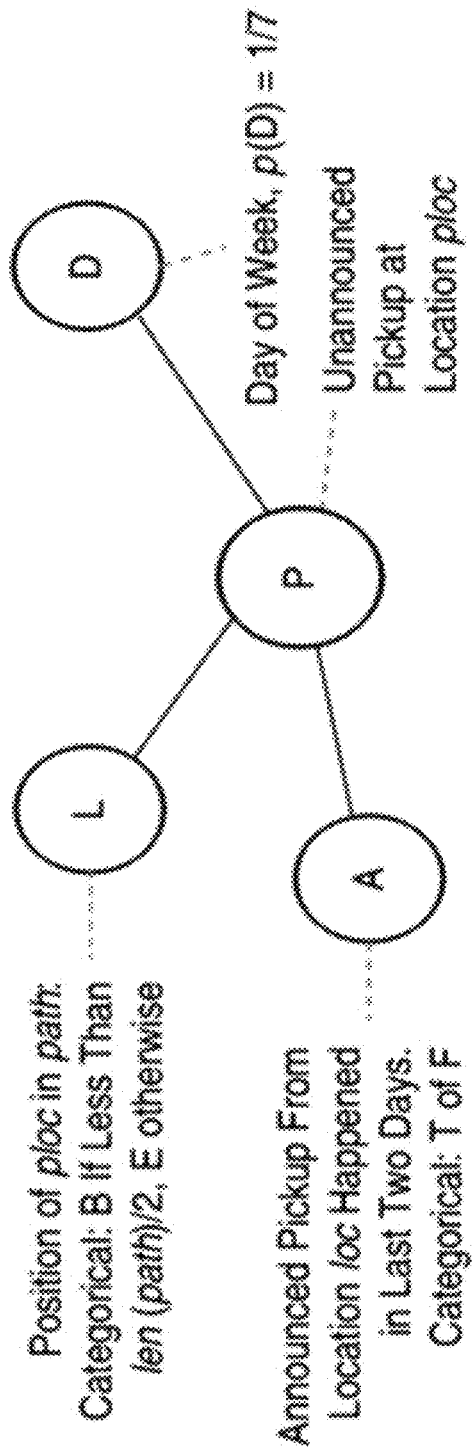
FIG. 2 shows an advance version of an uncertainty constraint using a simplified Bayesian Network (BN) according to an exemplary embodiment of this disclosure.

An advanced version of U1, U1', calculates v(ploc) using the simplified Bayesian network (BN) of FIG. 2. (For brevity reasons, FIG. 2 does not contain conditional probability values as they are inconsequential to the essence of the example.) Now, v(ploc) is the inferred probability for the BN random variable P (a random variable for an unannounced pickup at location ploc), the observations for the other random variable, that is, p(P=T|D=d, L=l, A=a)*p(D=d)*p(L=l)*p(A=a), where d, l, and a are the respective observations for D, L, and A.

Note that each path has its own BN because P(L) depends on path; that is, v(ploc) depends on the path. In other words, the BNs are integrated with the CE process because BN inference de-pends on the chosen path, thereby affecting the path score and the selected elite paths, too.

The Score Function Specification for Rigid, Optimization, and Uncertainty Constrains The score function is the kernel of the CE method. It is the only CE component that changes when search constraints and goals change. The score function returns a real number indicating a given path's score; the lower the number, the better the score, with negative scores indicating that the path conforms to the rigid requirements. We use a descending order of the score value (that is, lower is better); this is consistent with the approach taken by STL falsifiers. See] J. L. Eddeland, A. Donzé, S. Miremadi, and K. Akesso, "Industrial temporal logic specifications for falsification of cyber-physical systems," in Proc. 7th Int. Workshop Applied Verification of Continuous and Hybrid Systems, EPiC Series in Computing, vol. 74, pp. 267-274, 2020. For falsifiers, the falsification search has a goal of finding results with negative scores.

Listing 2, below, contains the pseudocode for the score function of our running example.

Step 1. For R1: if path ends in dead-end, return len(path)+ 4*n.

Step 2. For R1: if path ends in a location that is not a legitimate destination, return len(path)+3*n.

Step 3. For R2: count $L_{path}$: the number of drop-off locations along the path. If $L_{path}<L_{R2}$ then return $L_{R2}-L_{path}$+ n.

Step 4. For R3: see section "CE for Multiagent Pathfinding and Multiagent Constraints"

Step 5. For O1: let $d_{opt}$=−1−1/len(path).

Step 6. For O2: accumulate, over all locations loc along the path, either 0.5 if loc is on a narrow street, or 0 otherwise. Add the accumulated value to $d_{opt}$.

Step 7. For O3: see section "CE for Multiagent Pathfinding and Multiagent Constraints"

Step 8a. For U1: for every pickup location (denoted ploc) along the path, let $v(ploc)=p_{pickup}(ploc)*$(index of ploc in the path)/len(path). Let $u(ploc)=v(ploc)$ if $v(ploc)>0.3$, and 0 otherwise. Let $Sum_u=\Sigma_{ploc \in path}(u(ploc))$. A higher $Sum_u$ score is better; to invert that relationship, we use $d_u=0-Sum_u$ for the score function (step 9).

Step 8b. For U1' (using the BN of FIG. 1): $v(ploc)=p$ (P=T|D,L,A), the inferred probability of node pickup random variable of the BN of FIG. 1, given the observations of the other variables.

The variable $d_u$ helps CE gravitate towards visiting a pickup location later in the day rather than doing so earlier, all while weighing in the historical evidence of such a location having pickup to begin with.

Step 9. Return $d_{opt}+d_u$ (or some weighted sum of the two, depending on the relative importance assigned to O vs. U requirements).

The return value in steps 1 and 2 is a large positive number, rendering the path inadmissible; yet, by adding len(path), the CE is guided to gravitate toward shorter paths even among those violating R1. The return value in step 3 is also a large positive, albeit better than that of steps 1 and 2, thereby forcing the CE to gravitate to-ward paths that do satisfy R2. Step 5 constructs a cost measure dopt that is both negative (that is, an admissible path) and lower (better) the shorter the path. Step 6 forces the CE to gravitate toward paths that prefer to travel along wide streets over narrow streets. Step 9 forces the CE to gravitate toward paths that have a higher likelihood of visiting pickup locations with unannounced packages for pickup. Note that all of the paths being evaluated are programmatically assigned location src as their first location; therefore, that part of requirement R1 is not scored by the score function.

Ce for Multiagent Pathfinding and Multiagent Constraints

Clearly, a vehicle's fulfillment and score of requirements R3 and O3 depend not only on that vehicle's path but also on the paths assigned to other vehicles. To that end, a multiagent (multivehicle in the example) CE algorithm is applied as follows.

Run a plurality of CE pathfinders in a randomized round-robin manner; the round-robin iteration number is, therefore, the same as the iteration counter k of Listing 1. Each CE executes one iteration of steps 2-6 of Listing 1. Let $CE_i$ be the CE pathfinder for agent i, i=1..A. Let bestPath$_i^k$ be the best admissible path discovered so far (iteration k) by $CE_i$ or NIL if no admissible path was found by $CE_i$. For simplicity, we drop the superscript in bestPathik. Let bestPath→ be the ordered set {bestPath1, bestPath2, . . . , bestPathA}.

For our running example, the score function calculation for requirement R3 (step 4 of Listing 2) has each $CE_i$, i=1 . . . A, check that every drop-off location is visited by some bestPath$_j \in$bestPath→. If not, then CEi returns $1/(1+\alpha)+2*n$, where $\alpha=\Sigma j \neq i$ (number of dropoff visited by bestPath$_j \in$bestPath→). This score encourages all of the CEs to gravitate, as a group, toward paths that visit all drop-off and pickup locations.

The score function calculation for requirement O3 (step 7 of Listing 2) has each $CE_i$, i=1 . . . A, count for each pickup and drop-off location loc, the number of bestPathj∈bestPath→, j≠i, that visit loc, denoted as n(loc). If n(loc)>0, then CEi updates $d_{opt}=d_{opt}+(n(loc)/n)$; this incentivizes CEi to find a path with a small n(loc), all while maintaining $d_{opt}<0$ (that is, an admissible path).

Figure 3:
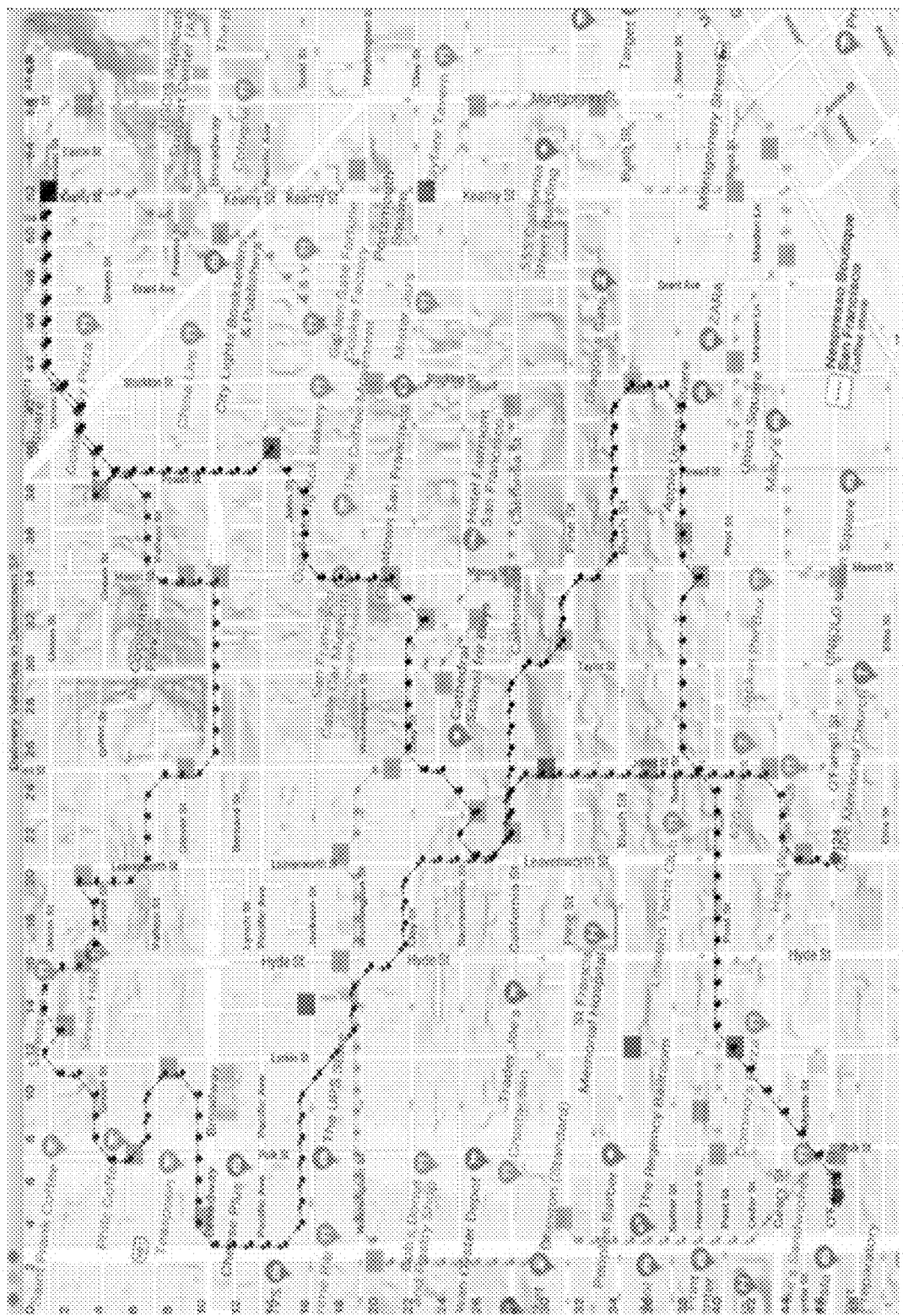
FIG. 3 shows a domain-of-disclosure environment, including a geographical area, according to an exemplary embodiment of this disclosure.

FIG. 3 shows the visualization of a multiagent CE execution for the example, including a domain-of-disclosure environment, including a geographical area, according to an exemplary embodiment of this disclosure.

It depicts each vehicle path as a colored dotted sequence, where a) the source location (the same src location for all vehicles) is indicated by the dark blue square; b) each vehicle has its own destination location, indicated by a red circle at the end of the respective path; c) the 44 drop-off locations are indicated by aqua squares; d) the six possible pickup locations are indicated by green squares, with their probability of pickup being 0.7, 0.4, 0.83, 0.55, 0.63, and 0.83, using a top-down order in the map; and e) L=44+6=50, and therefore $L_{R2}=(L-12)/A=38/4=9.5$.

Note that two pickup locations (<16,14> and <35,12>) are not assigned to any path. This is because either such a location is too early in the path or because it would increase the path length substantially, thereby working against requirement O1.

Listing 3 shows sections of the log trace for this CE execution. Note how up to iteration k=21, the score values for all agents are more than 6,000 (that is, 2*n), which means that rigid requirement R3 failed for all paths for all four agents. From k=22, the discovered paths become admissible (have negative scores) and improve thereafter by obtaining better results for optimization and uncertainty results. The large number of iterations is due to the high value of d (30) used in step 4 of the CE method shown n Listing 1 above.

Listing 3. Cost values from execution of multi-agent path finding CE for the example, generated using a Java multi-threading (vice randomized round-robin scheduler) implementation.

Agent #3, k=0: best path cost=6,000.142857142857
Agent #0, k=0: best path cost=6,000.142857142857
Agent #1, k=0: best path cost=6,000.142857142857
Agent #2, k=0: best path cost=6,000.090909090909

. . .

Agent #2, k=21: best path cost=6,000.02
Agent #1, k=21: best path cost=6,000.02
Agent #3, k=21: best path cost=6,000.02
Agent #0, k=22: best path cost=6,000.02
Agent #2, k=22: best path cost=−1.003638861304204
Agent #1, k=22: best path cost=−1.0076493416493417
Agent #3, k=22: best path cost=−1.0059857819905214
Agent #0, k=23: best path cost=−1.0066998158379374
Agent #2, k=23: best path cost=−1.00391295511677283
Agent #1, k=23: best path cost=−1.0081245421245422

. . .

Agent #0, k=58: best path cost=−1.0068738738738738
Agent #1, k=62: best path cost=−1.0095432098765433
Agent #3, k=60: best path cost=−1.008
Agent #2, k=59: best path cost=−1.007698795180723.

Further Analysis;

While the actual files are not included here, according to the running example, the following points/analysis is provided to supplement the description provided above. Note: trans_mat below is equivalent to Mat above.

File names indicate the source, such as "patent_transmat_for_agent_3_t_5.txt" being trans_mat for agent #3 at t=5 (t here is the k iteration counter of listing 1, steps 1 and 6). Agent #3 is the black agent in FIG. 3.

As an example, examined is the progression of agent #3 at t=0,t=5,t=10 (patent_transmat_for_agent_3_t_0.txt, patent_transmat_for_agent_3_t_5.txt, patent_transmat_for_agent_3_t_10.txt):

Below is an examination of the probabilities associated with grid location<17,34> in FIG. 3.

For t=0:

this.trans_mat[location_i=17,location_j=34][1]=0.346857 which means that probability 0.346857 that this agent (#3) will move in direction 1, probability 0, 222092 in direction 5, etc.
this.trans_mat[location_i=17, locationj=34][5]=0.222092
this.trans_mat[location_i=17, locationj=34][6]=0.228659
this.trans_mat[location_i=17, locationj=34][7]=0.202392
Direction 1 is "increasing i value, while j remains as is", i.e., straight down in FIG. 3
Direction 2 is "increasing I and j values", i.e., down and right in FIG. 3
. . .

The meaning of the second index (ranging 0 to 7) is like this, -x is the current location. For example: this.trans_mat [location_i=17,location_j=34][0] represents "down and left"
|6|5|7|
|4|x|3|
|0|1|2|
For t=5:
this.trans_mat[location_i=17, locationj=34][1]=0.673271
this.trans_mat[location_i=17, locationj=34][5]=0.124284
this.trans_mat[location_i=17, locationj=34][6]=0.100125
this.trans_mat[location_i=17, locationj=34][7]=0.102320
For t=10:
this.trans_mat[location_i=17, locationj=34][1]=0.891155
this.trans_mat[location_i=17, locationj=34][5]=0.028044
this.trans_mat[location_i=17, locationj=34][6]=0.035648
this.trans_mat[location_i=17, locationj=34][7]=0.045154
For t=15:
this.trans_mat[location_i=17, locationj=34][1]=0.960233
this.trans_mat[location_i=17, locationj=34][5]=0.010472
this.trans_mat[location_i=17, locationj=34][6]=0.012336
this.trans_mat[location_i=17, locationj=34][7]=0.016959
For t=20:
this.trans_mat[location_i=17, locationj=34][1]=0.988963
this.trans_mat[location_i=17, locationj=34][5]=0.007800
this.trans_mat[location_i=17, locationj=34][6]=0.001829
this.trans_mat[location_i=17, locationj=34][7]=0.001408
The increasing probability of this.trans_mat[location_i=17, location_j=34][1] shows that as algorithm progresses it increasingly prefers to move straight down from location<17,34> in FIG. 3.

Figure 4:
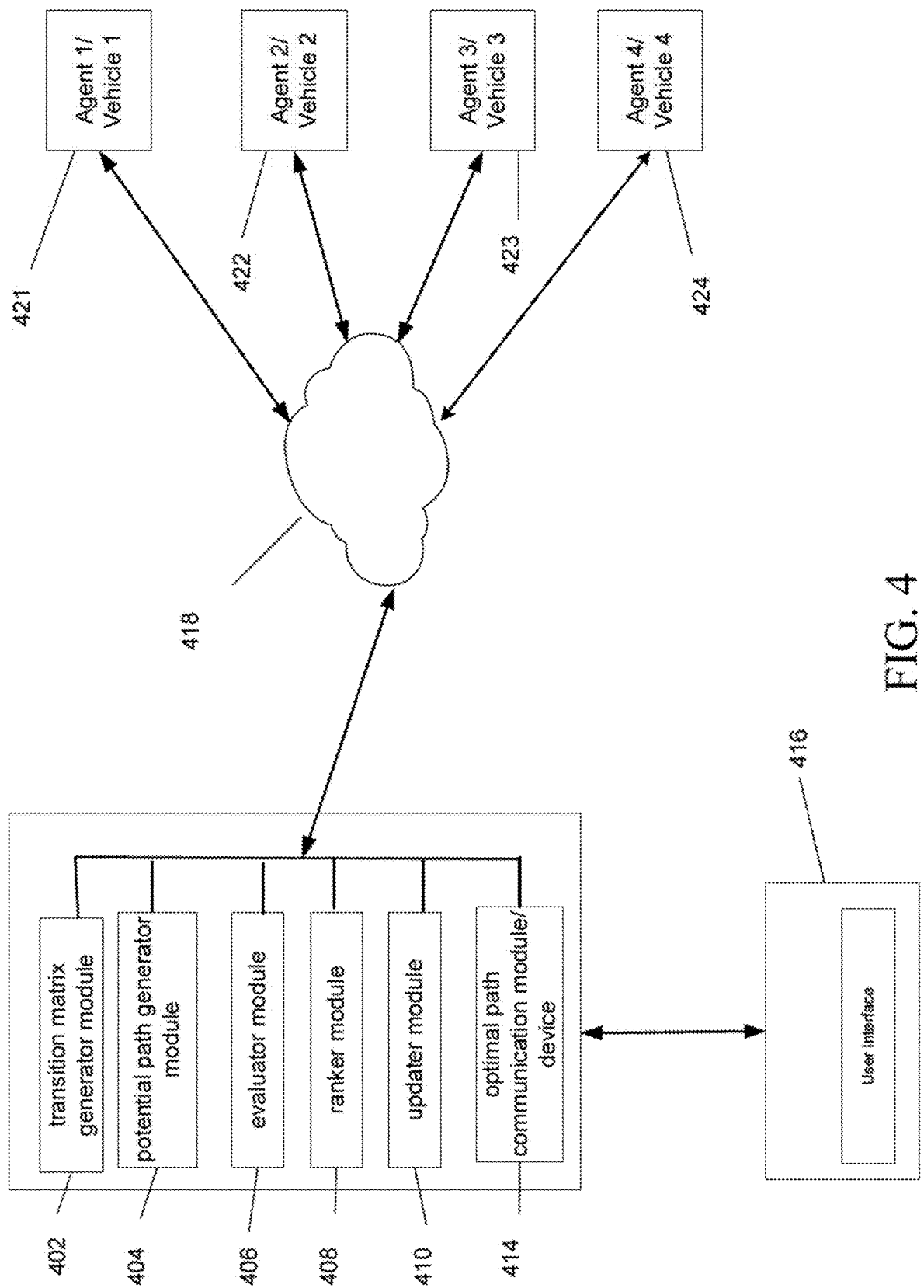
FIG. 4 shows a block diagram of a system for multiagent pathfinding associated with a domain-of-discourse according to an exemplary embodiment of this disclosure.

With reference to FIG. 4, shown is a block diagram of a system for multiagent pathfinding associated with a domain-of-discourse according to an exemplary embodiment of this disclosure. The system shown is only one example of a system to implement the CE methods discussed herein.

As shown, the system includes a transition matrix generator module 402, potential path generator module 404, evaluator module 406, ranker module 408, updater module 410, and optimal path communication module/device 414 operatively associated with a server/computer which can be cloud based or resides at a facility. User Interface 416 can include any computing means that is accessible to a user/dispatcher/administrator. The user interface operatively communicates with the platform including the transition matrix generator module 402, potential path generator module 404, evaluator module 406, ranker module 408, updater module 410, and optimal path communication module/device 414. The system further includes a Cloud based internet/intranet network 418, Agent 1/Vehicle 1 421, Agent 2/Vehicle 2 422, Agent 3/Vehicle 3 423, and Agent 4/Vehicle 4 424.

To summarize, the disclosed methods and systems for multiagent pathfinding include the ability to solve difficult search problems whose cost function does not enjoy the optimal substructure property, is a multiagent cost function, and contains uncertainties modeled with one or a BN of random variables. There are many potential applications for the disclosed methods and systems, such as video gaming, large-scale shipping operations, air traffic management, and military logistics.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

Below are java files which include listings associated with an implementation of the disclosed methods and systems.

*CrossEntropyChessBoard_UPS_SFAgent.java file that contains the score/cost function used by each agent.*

- The cost function is: score()
- The constraints are listed and explained in the comment on the top of the file, like R1,R2,O1, etc.
- The score function has comments showing where each constraint is implemented.
- One of the constraints takes the state of other agents into account: it is O3, and the inter-agent data is collected in the loop
for (int nOtherAgent = 0; nOtherAgent < allAgentPaths.length; nOtherAgent++) {...
- The code after the comment "//Req U1
Has
double _reward = pickupLocation.probabilityOfPickup*nIndexOfPickupInPath;
if (_reward > U1_THRESHOLD) pickupReward += _reward;

This pickupReward is then integrated into the overall cost value returned from score()
The probabilityOfPickup is fixed, and is set in Environment_UPS_SF.java, where the third argument is the probability.
addPickupLocation(14,40, 0.7, pickupLocationsList);
addPickupLocation(16, 14, 0.4, pickupLocationsList);
addPickupLocation(23,52, 0.83, pickupLocationsList);

addPickupLocation(30,25, 0.55, pickupLocationsList);
addPickupLocation(35,12, 0.63, pickupLocationsList);
addPickupLocation(41,12, 0.83, pickupLocationsList);

---

*package crossentropy2D.UPS_SF_;* import java.util.ArrayList;
import crossentropy.ChessBoardPositionPair;
import crossentropy.GraphPath;
import crossentropy.ScoredPath;
import crossentropy.TimedScoredPath;
import crossentropy2D.r_and_d_versions.CrossEntropyChessBoard_V2;

```
/*
 * UPS/DHL/USPS paper example - Constrains:
 * There are 2 sets of locations: (i) DL: dropoff-locations (dropping off packages) (ii) PL: pickup locations +
 probability of pickup based on day, location, etc.
 * -Rigid req's:
 * -      R1: each van has a starting src and a designated AREA it finishes route in (street) -- implemented using
 custom isPositionTheDestination()
 * -      R2: each van must go to at least  (#dropoffLocations + #pickupLocations -12)/#agents of the
 #dropoffLocations + #pickupLocations locations
 * -      R3: van cannot travel on blocked Alleys (implemented via avoidObstacles())
 * -      R4: each of the (#dropoffLocations + #pickupLocations) dropoff and pickup locations must be assigned to
 some van
 * -Opt constraints
 * -      O1: strive for short paths
 * -      O2: prefer wide streets
 * -      O3: 2 vans should not go to same dropoff or pickup location -- this is not Rigid like O4, we might tolerate a
 duplicate truck visit
 * -Uncertainty
 * -      U1: Some buildings (listed in environment_UPS_SF.pickupLocations) are company's which might or might
 not have pickup
 *          probability is _reward= probability*(index of location on path/peth.len())
 *                  (indicating how late it will be reached -- later --> higher Prob)
 *          _reward is included in score if its > 0.3
 * NOTE!The ratio between this score and the Opt scores is
 Uncertainty=OPT_TO_UNCERTAINTY_RATIO(50%), Opt=50% this uncertainty score (for all
 */
public class CrossEntropyChessBoard_UPS_SFAgent extends CrossEntropyChessBoard_V2 {
        static final double OPT_TO_UNCERTAINTY_RATIO = 0.5;
        static final double U1_THRESHOLD = 0.3;
        //***Play with these
        static final boolean REQ_O2_ON = true;
        //***
        final static int DEFAULT_NUM_SAMPLES = 10; // when comparing 2 paths, compare every 10 sample points by default
        final int nRelativeStartTime;
        final protected int nAgentNumber;
        final protected int nNumTotalAgents;
        final TimedScoredPath[] allAgentPaths; // when agents set cost that relates to where other agents are -->
        // use this as shared memory (taken from the agents this.scored_paths[0])
```

```
        public CrossEntropyChessBoard_UPS_SFAgent(int c, int seed, int n, int m,
Environment_UPS_SF environment_UPS_SF,
                        ChessBoardPositionPair pSrc, ChessBoardPositionPair pDest,
                                int nAgentNumber,
                                int nNumTotalAgents,
                                TimedScoredPath[] allAgentPaths,
                                int nRelativeStartTime
                                ) throws Exception {
                super(c, seed, n, m, environment_UPS_SF, pSrc, pDest);
                this.nAgentNumber = nAgentNumber;
                this.nNumTotalAgents = nNumTotalAgents;
                this.nRelativeStartTime = nRelativeStartTime;
                this.allAgentPaths = allAgentPaths;
                if (this.allAgentPaths.length != this.nNumTotalAgents) throw new
Exception("allAgentPaths.length != this.nNumTotalAgents");

}

@Override
        public double score(GraphPath path) throws Exception {
                Environment_UPS_SF environment_UPS_SF =
(Environment_UPS_SF)this.environment;

// i.e., path did not reach destination (see "if
(!(isPositionTheDestination(lastVertexInPath,nDestNode))) {" in CrossEntropyGraph.java
                if (!path.isGoodPath()) {
                        //i.e. bad path because it entered deadend (deadend due to obstacled): return a
value that promotes longer paths,
                        // yet bad/high result - worse than simply not reaching destination (e.g. because
getting into a deadend due-to-a-loop)
                        if (isInDeadEnd(path.get(path.len() - 1)))
                                return 1/(double)path.len() + (double)(4*this.n);
                        double d = 1/(double)path.len() + (double)(3*this.n);  // as far as path.len() goes,
prefer longer paths - they have better chance of reaching destination and add better statistics
                        //Add heuristic of how far it is from dest
                        //d += h(path); // "h" - named after A*'s h()
                        return d;
                } boolean bRigitConstraintsOK = true;

//===========================Optimization constraints
                //REQ_O1
                double d = (double)path.len();

//====
                // REQ_O2: add to path len:
                // 0 for point over WIDE_STREET
                // 0.5 for point over  NARROW_STREET (i.e., 2 narrow road crossings is like extending
path by 1)
                // 4 (Rigid constraint violation) otherwise - (Rigid constraint violation)
                for (int step = 0; step < path.len(); step++) {
                        int location = path.get(step);
                        ChessBoardPositionPair pair = this.environment.fromVertexToPair(location);
                        d += REQ_O2_ON?environment_UPS_SF.getPointPenalty(pair):0;
                }
```

```
                    {
            //Not official constraint but I prefer as few zig-zags as possible
            for (int step = 1; step < path.len(); step++) {
                    int location = path.get(step);
                    ChessBoardPositionPair pair =
this.environment.fromVertexToPair(location);
                    int prevLocation = path.get(step-1);
                    ChessBoardPositionPair prevPair =
this.environment.fromVertexToPair(prevLocation);
                    if (!isStraightMove(prevPair, pair))
                            d += 0.25;
            }

} if (!bRigitConstraintsOK){
                    path.setNotGoodPath(); // because rigid constraint was violated
                    return d*n; // return high number but still prefer shorter paths. Number must be >
0 so that bRigidConstraintsSatisified() fails on it
            } else {
                    d = -1 - 1/d; // smaller is better, and negative, close to -1 (so it passes
"bRigidConstraintsSatisified()" test in isSpecificationConformedTo()), where shorter path is smaller
number //Req R4, O3
                    // make 2 arrays marking which dropoffLocations and pickupLocations are
already assigned to a truck/agent
                    boolean[] dropoffLocationsAssigned = new
boolean[environment_UPS_SF.dropoffLocations.length];
                    for (int i = 0; i < dropoffLocationsAssigned.length; i++)
dropoffLocationsAssigned[i] = false;
                    boolean[] pickupLocationsAssigned = new
boolean[environment_UPS_SF.pickupLocations.length];
                    for (int i = 0; i < pickupLocationsAssigned.length; i++) pickupLocationsAssigned[i]
= false;

for (int nOtherAgent = 0; nOtherAgent < allAgentPaths.length; nOtherAgent++) {
                            if (nOtherAgent == this.nAgentNumber) continue;
                            TimedScoredPath tsp = allAgentPaths[nOtherAgent];
                            ArrayList<Integer> dropOffLocationIndexes = new ArrayList<Integer>();
                            if (tsp != null) dropOffLocationIndexes =
environment_UPS_SF.getDropoffLocationIndexes(tsp.getPath()); //indexes (in dropoffLocations) of all
dropoff locations this path visits, as indexes in environment_UPS_SF.dropoffLocations
                            for (int dropOffLocationIndex: dropOffLocationIndexes)
dropoffLocationsAssigned[dropOffLocationIndex] = true;
                            ArrayList<Integer> pickupLocationIndexes = new ArrayList<Integer>();
                            if (tsp != null) pickupLocationIndexes =
environment_UPS_SF.getPickupLocationIndexes(tsp.getPath()); //indexes (in pickupLocations) of all
pickup locations this path visits, as indexes in environment_UPS_SF.pickupLocations
                            for (int pickupLocationIndex: pickupLocationIndexes)
pickupLocationsAssigned[pickupLocationIndex] = true;
                    }

//A. check how many times I'm stepping on already used dropoff or pickup
locations
                    int nNumberOfDropOffAssignedToMe = 0;
```

```
                int nNumberPickupAssignedToMe = 0;
                int nUsingAlreadyUsedDropoffOrPickup = 0;
                ArrayList<Integer> dropOffLocationIndexes =
environment_UPS_SF.getDropoffLocationIndexes(path); //all dropoff locations this path visits, as indexes
in environment_UPS_SF.dropoffLocations
                ArrayList<Integer> pickupLocationIndexes =
environment_UPS_SF.getPickupLocationIndexes(path); //all pickup locations this path visits, as indexes
in environment_UPS_SF.pickupLocations
                for (int n: dropOffLocationIndexes) {
                        if (dropoffLocationsAssigned[n])
                                nUsingAlreadyUsedDropoffOrPickup++;
                        else {// used in B below
                                dropoffLocationsAssigned[n] = true;
                                nNumberOfDropOffAssignedToMe++;
                        }
                }
                for (int n: pickupLocationIndexes) {
                        if (pickupLocationsAssigned[n]) nUsingAlreadyUsedDropoffOrPickup++;
                        else {// used in B  below
                                pickupLocationsAssigned[n] = true;
                                nNumberPickupAssignedToMe++;
                        }
                }

//A. R4: Check that combined with this path, all dropoff  locations are assigned to
some agent
                int nDropOffAssigned = 0;
                for (int i = 0; i < dropoffLocationsAssigned.length; i++) if
(dropoffLocationsAssigned[i]) nDropOffAssigned++;
                int nPickupAssigned = 0;
                for (int i = 0; i < pickupLocationsAssigned.length; i++) if
(pickupLocationsAssigned[i]) nPickupAssigned++;
                if (nDropOffAssigned < dropoffLocationsAssigned.length /*|| nPickupAssigned !=
pickupLocationsAssigned.length*/) { //Not insisting on assigning all pickup locations - it is an
uncertainty/optimization goal, to add pickup locations for which _reward>0.3
                        path.setNotGoodPath(); // because rigid constraint was violated
                        //*** Note that In code for IEEE Computer paper I added
nPickupAssigned, although that's not part of requirement
                        double _dRet =
(1/((double)nDropOffAssigned+(double)nPickupAssigned+1))+(double)2*this.n;
                        return _dRet;
                }

//Calc how many dropoff and pickup locations this agent's path should assign
                // R2: each van must go to at least (#dropoffLocations + #pickupLocations.length-
12)/#agents
                int nMyNumberOfDropoffPickupLB =
        Math.round((environment_UPS_SF.dropoffLocations.length+environment_UPS_SF.pickupLocatio
ns.length-12)/nNumTotalAgents); //lower bound //Check that this path is assigned the correct number of dropoff and pickup
locations
                int nAssignedToMe = nNumberOfDropOffAssignedToMe +
nNumberPickupAssignedToMe;
                if (nAssignedToMe < nMyNumberOfDropoffPickupLB) {
```

```
                    path.setNotGoodPath(); // because rigid constraint was violated
                    double dPenalty = 0;
                    if (nAssignedToMe < nMyNumberOfDropoffPickupLB)
                        dPenalty = Math.abs(nAssignedToMe - nMyNumberOfDropoffPickupLB);
                    return (double)this.n + dPenalty;
                } if (nUsingAlreadyUsedDropoffOrPickup > 0) {
                    //path.setNotGoodPath(); // because rigid constraint was violated
                    //d is negative, I want it larger as nUsingAlreadyUsedDropoffOrPickup grows, while keeping d negative
                    return d + (double)(nUsingAlreadyUsedDropoffOrPickup)/(double)n; // O3 is optimization and its violation is not as bad as R4 violation. Add penalty for nUsingAlreadyUsedDropoffOrPickup > 0, but not enough to induce d>0
                }

//Req U1
                // For each pickup assigned to me: if p(pickup)*index-in-path-of-that-pickup/peth.len() > 0.3,
                // add that value to pickupReward
                double pickupReward = 0; // the larger the better
                {
                    pickupLocationIndexes = environment_UPS_SF.getPickupLocationIndexes(path);
                    for (Integer pickupIndex: pickupLocationIndexes) {
                        PickupLocation pickupLocation = environment_UPS_SF.pickupLocations[pickupIndex];
                        //find it's index in path
                        int nIndexOfPickupInPath = -1;
                        for (int nIndex = 0; nIndex < path.len(); nIndex++) {
                            if (path.get(nIndex) == pickupLocation.location) {
                                nIndexOfPickupInPath = nIndex;
                                break;
                            }
                        }
                        if (nIndexOfPickupInPath == -1) throw new Exception("Unexpected! pickupLocation.location=" + pickupLocation.location + " not found in path="+path.toStr());
                        double _reward = pickupLocation.probabilityOfPickup*nIndexOfPickupInPath;
                        if (_reward > U1_THRESHOLD) pickupReward += _reward;
                    }
                } double denom = d + -1.0*pickupReward;//pickupReward is made negative, so that larger pickupReward induces smaller return value
                return d*OPT_TO_UNCERTIANTY_RATIO/denom + -1.0*OPT_TO_UNCERTIANTY_RATIO*pickupReward/denom; // 50/50, normalized
            }
        } public boolean bRigidConstraintsSatisified(double dScore) {
            return dScore < 0;
        }
```

```java
@Override
public boolean isSpecificationConformedTo(ScoredPath scoredPath) throws Exception {
        boolean bIsGoodPath = bRigidConstraintsSatisified(scoredPath.score_for_path);
        { // sanity test
                boolean bIsGoodPath2 = scoredPath.getPath().isGoodPath();
                //a-->b == !a || b
                boolean iff = (!bIsGoodPath || bIsGoodPath2) && (bIsGoodPath || !bIsGoodPath2);
                if (!iff) throw new Exception("Sanity test in isSpecificationConformedTo failed!");
        }
        boolean b = isPositionTheDestination(scoredPath.getPath().get(scoredPath.getPath().len() - 1), this.getDest());
        return bIsGoodPath && b;
}

@Override
public ScoredPath shortestPath() throws Exception {
        ScoredPath scoredPath = super.shortestPath(allAgentPaths, this.nAgentNumber);
        return scoredPath;
}

@Override
public boolean isPositionTheDestination(int pos, int dest) throws Exception {
        Environment_UPS_SF environment_UPS_SF = (Environment_UPS_SF)this.environment;
        int nDestRow = 47;
        int nDestCol1 = 5;
        int nDestCol2 = 3;
        int nDestCol3 = 23;
        int nDestCol4 = 20;
        if (environment_UPS_SF.getGrid().getGrid().length == 100) {
                nDestRow = 2*nDestRow;
                nDestCol1 = 2*nDestCol1;
                nDestCol2 = 2*nDestCol2;
                // i.e., I called doubleTheGrid()
        }

ChessBoardPositionPair pos_pair = fromVertexToPair(pos);
        if (Environment_UPS_SF.isDropoffLocation(pos, environment_UPS_SF.dropoffLocations)) {
                return false;
        }
        else if (Environment_UPS_SF.isPickupLocation(pos, environment_UPS_SF.pickupLocations)) {
                return false;
        } if (pos_pair.get_i() == nDestRow) {
                boolean b1 = pos_pair.get_j() <= nDestCol1 && nDestCol2 <= pos_pair.get_j();
                boolean b2 = pos_pair.get_j() <= nDestCol3 && nDestCol4 <= pos_pair.get_j();
                return b1||b2;
        }
        return false;
}
```

```
/*
// "h" - named after A*'s h()
// heuristic of dist from dest (straight line)
private double h(int pos) {
        ChessBoardPositionPair pos_pair = fromVertexToPair(pos);
        int n1 = pos_pair.get_i() - 94;
        int n2 = pos_pair.get_j() - 94;
}
*/

//i.e. bad path because it entered deadend (deadend due to obstacled): return a value that promotes longer paths,
        // yet bad/high result - worse than simply not reaching destination (e.g. because getting into a deadend due-to-a-loop)
        private boolean isInDeadEnd(int pos) {
                int[][] grid = this.environment.getGrid().getGrid();
                ChessBoardPositionPair pos_pair = fromVertexToPair(pos);
                int i = pos_pair.get_i();
                int j = pos_pair.get_j();
                int nNumOfOpenNeigbors = Grid_UPS_SF.getNumOfOpenNeigbors(i, j, grid) ;
                return nNumOfOpenNeigbors <= 1;
        } private boolean isStraightMove(ChessBoardPositionPair prevPair, ChessBoardPositionPair pair) {
                boolean b =  prevPair.get_i() == pair.get_i();
                b = b || (prevPair.get_j() == pair.get_j());
                return b;
        }

}
```

---

Environment_UPS_SF.java file

---

```
package crossentropy2D.UPS_SF;

import java.util.ArrayList;
import crossentropy.ChessBoardPositionPair;
import crossentropy.Environment;
import crossentropy.GraphPath;
import crossentropy2D.swarmSF_for_Outreach.GridSF;
import crossentropy2D.swarmSF_for_Outreach.GridSF.ObstacleSF;

public class Environment_UPS_SF extends Environment {
        public static final boolean DOUBLE_THE_GRID = false; //zzz
        final int[] dropoffLocations;
        final PickupLocation[] pickupLocations;
        public Environment_UPS_SF(int nWIDTH, int nHEIGHT) throws Exception {
                super(new Grid_UPS_SF(nWIDTH, nHEIGHT), null);

//Set dropoffLocations list
                {
                        ArrayList<ChessBoardPositionPair> dropoffLocationsList = new
```

```
ArrayList<ChessBoardPositionPair>();
                ChessBoardPositionPair aChessBoardPositionPair = new ChessBoardPositionPair(6,7); dropoffLocationsList.add(aChessBoardPositionPair);
                aChessBoardPositionPair = new ChessBoardPositionPair(8,11); dropoffLocationsList.add(aChessBoardPositionPair);
                aChessBoardPositionPair = new ChessBoardPositionPair(18,16); dropoffLocationsList.add(aChessBoardPositionPair);
                aChessBoardPositionPair = new ChessBoardPositionPair(18,21); dropoffLocationsList.add(aChessBoardPositionPair);
                aChessBoardPositionPair = new ChessBoardPositionPair(20,2); dropoffLocationsList.add(aChessBoardPositionPair);
                aChessBoardPositionPair = new ChessBoardPositionPair(21,25); dropoffLocationsList.add(aChessBoardPositionPair);
                aChessBoardPositionPair = new ChessBoardPositionPair(24,29); dropoffLocationsList.add(aChessBoardPositionPair);
                aChessBoardPositionPair = new ChessBoardPositionPair(23,32); dropoffLocationsList.add(aChessBoardPositionPair);
                aChessBoardPositionPair = new ChessBoardPositionPair(19,53); dropoffLocationsList.add(aChessBoardPositionPair);
                aChessBoardPositionPair = new ChessBoardPositionPair(20,43); dropoffLocationsList.add(aChessBoardPositionPair);
                aChessBoardPositionPair = new ChessBoardPositionPair(21,34); dropoffLocationsList.add(aChessBoardPositionPair);
                aChessBoardPositionPair = new ChessBoardPositionPair(26,23); dropoffLocationsList.add(aChessBoardPositionPair);
                aChessBoardPositionPair = new ChessBoardPositionPair(3,20); dropoffLocationsList.add(aChessBoardPositionPair);
                aChessBoardPositionPair = new ChessBoardPositionPair(2,13); dropoffLocationsList.add(aChessBoardPositionPair);
                aChessBoardPositionPair = new ChessBoardPositionPair(3,56); dropoffLocationsList.add(aChessBoardPositionPair);
                aChessBoardPositionPair = new ChessBoardPositionPair(11,50); dropoffLocationsList.add(aChessBoardPositionPair);
                aChessBoardPositionPair = new ChessBoardPositionPair(26,32); dropoffLocationsList.add(aChessBoardPositionPair);
                aChessBoardPositionPair = new ChessBoardPositionPair(28,42); dropoffLocationsList.add(aChessBoardPositionPair);
                aChessBoardPositionPair = new ChessBoardPositionPair(11,34); dropoffLocationsList.add(aChessBoardPositionPair);
                aChessBoardPositionPair = new ChessBoardPositionPair(9,34); dropoffLocationsList.add(aChessBoardPositionPair);
                aChessBoardPositionPair = new ChessBoardPositionPair(3,16); dropoffLocationsList.add(aChessBoardPositionPair);
                aChessBoardPositionPair = new ChessBoardPositionPair(47,7); dropoffLocationsList.add(aChessBoardPositionPair);
                aChessBoardPositionPair = new ChessBoardPositionPair(28,34); dropoffLocationsList.add(aChessBoardPositionPair);
                aChessBoardPositionPair = new ChessBoardPositionPair(33,56); dropoffLocationsList.add(aChessBoardPositionPair);
                aChessBoardPositionPair = new ChessBoardPositionPair(41,52); dropoffLocationsList.add(aChessBoardPositionPair);
                aChessBoardPositionPair = new ChessBoardPositionPair(31,4); dropoffLocationsList.add(aChessBoardPositionPair);
                aChessBoardPositionPair = new ChessBoardPositionPair(41,44); dropoffLocationsList.add(aChessBoardPositionPair);
                aChessBoardPositionPair = new ChessBoardPositionPair(47,34);
```

```
dropoffLocationsList.add(aChessBoardPositionPair);
        aChessBoardPositionPair = new ChessBoardPositionPair(45,21);
dropoffLocationsList.add(aChessBoardPositionPair);
        aChessBoardPositionPair = new ChessBoardPositionPair(35,43);
dropoffLocationsList.add(aChessBoardPositionPair);
        aChessBoardPositionPair = new ChessBoardPositionPair(28,22);
dropoffLocationsList.add(aChessBoardPositionPair);
        aChessBoardPositionPair = new ChessBoardPositionPair(39,34);
dropoffLocationsList.add(aChessBoardPositionPair);
        aChessBoardPositionPair = new ChessBoardPositionPair(38,36);
dropoffLocationsList.add(aChessBoardPositionPair);
        aChessBoardPositionPair = new ChessBoardPositionPair(43,25);
dropoffLocationsList.add(aChessBoardPositionPair);
        aChessBoardPositionPair = new ChessBoardPositionPair(36,25);
dropoffLocationsList.add(aChessBoardPositionPair);
        aChessBoardPositionPair = new ChessBoardPositionPair(31,31);
dropoffLocationsList.add(aChessBoardPositionPair);
        aChessBoardPositionPair = new ChessBoardPositionPair(43,54);
dropoffLocationsList.add(aChessBoardPositionPair);
        aChessBoardPositionPair = new ChessBoardPositionPair(40,7);
dropoffLocationsList.add(aChessBoardPositionPair);
        aChessBoardPositionPair = new ChessBoardPositionPair(10,4);
dropoffLocationsList.add(aChessBoardPositionPair);
        aChessBoardPositionPair = new ChessBoardPositionPair(9,25);
dropoffLocationsList.add(aChessBoardPositionPair);
        aChessBoardPositionPair = new ChessBoardPositionPair(26,56);
dropoffLocationsList.add(aChessBoardPositionPair);
        aChessBoardPositionPair = new ChessBoardPositionPair(44,49);
dropoffLocationsList.add(aChessBoardPositionPair);
        aChessBoardPositionPair = new ChessBoardPositionPair(39,9);
dropoffLocationsList.add(aChessBoardPositionPair);
        aChessBoardPositionPair = new ChessBoardPositionPair(4,38);
dropoffLocationsList.add(aChessBoardPositionPair);
        this.dropoffLocations = new int[dropoffLocationsList.size()];
        for (int i = 0; i < dropoffLocationsList.size(); i++) this.dropoffLocations[i] = this.fromPairToVertex(dropoffLocationsList.get(i));

//check that location is not an obstacle
        for (int pt: dropoffLocations) {
            ChessBoardPositionPair pair = this.fromVertexToPair(pt);
            if (this.gridContainer.getGrid()[pair.get_i()][pair.get_j()] <= 0) throw new Exception("Drop off location <"+pair.get_i() +"," +pair.get_j() + "> is an obstacle");
        }
    }
    //Set pickupLocations list
    {
        ArrayList<PickupLocation> pickupLocationsList = new ArrayList<PickupLocation>();

addPickupLocation(14,40, 0.7, pickupLocationsList);
        addPickupLocation(16, 14, 0.4, pickupLocationsList);
        addPickupLocation(23,52, 0.83, pickupLocationsList);
        addPickupLocation(30,25, 0.55, pickupLocationsList);
        addPickupLocation(35,12, 0.63, pickupLocationsList);
        addPickupLocation(41,12, 0.83, pickupLocationsList);
```

```
            this.pickupLocations = new PickupLocation[pickupLocationsList.size()];

for (int i = 0; i < pickupLocationsList.size(); i++) this.pickupLocations[i] = pickupLocationsList.get(i);

//check that location is not an obstacle
            for (PickupLocation loc: this.pickupLocations) {
                int pt = loc.location;
                ChessBoardPositionPair pair = this.fromVertexToPair(pt);
                if (this.gridContainer.getGrid()[pair.get_i()][pair.get_j()] <= 0) throw new Exception("Pickup location <"+pair.get_i() +"," +pair.get_j() + "> is an obstacle");
            }

//GRID_SIZE_NOTE:
            // The SF grid didn't have enough separation --> unconnected streets in neighboring cells were considered connected
            // There are 2 possible solutions:
            // 1) roads map is really a graph --> so the problem becomes a graph problem, like TSP
            // 2) make finer granularity cells, which is what I did
            //   For large maps the graph approach is better
            // HOW_TO_HANDLE graph rep: note that trans_mat for TSP is O(n^2) because potentially there's an edge between every pair of node
            //                      maps are not like that, road connect nearby junctions. Therefore trans_mat s.b. an adjacency LIST (array of nodes, each having a list of neighbors) instead of adjacency matrix
            if (DOUBLE_THE_GRID) {
                doubleTheGrid(2); // convert the original SF grid to 2Wx2H
                populateMissingObstaclesForDoubleGrid(); // making sure roads that are not connected are separated by an obstacle
            }
        }

}

// convert the original SF grid to 2Wx2H --> see GRID_SIZE_NOTE
    private void doubleTheGrid(int nFactor) {
        Grid_UPS_SF grid_UPS_SF = (Grid_UPS_SF)this.gridContainer;
        int[][] grid = grid_UPS_SF.getGrid();
        int[][] newGrid = new int[nFactor*grid.length][nFactor*grid[0].length]; // double dim's
        for (int i = 0; i < grid.length; i++) {
            for (int j = 0; j < grid[0].length; j++) {
                newGrid[nFactor*i][nFactor*j] = grid[i][j];
                newGrid[nFactor*i+1][nFactor*j] = grid[i][j];
                newGrid[nFactor*i][nFactor*j+1] = grid[i][j];
                newGrid[nFactor*i+1][nFactor*j+1] = grid[i][j];
            }
        }
        grid_UPS_SF.setGrid(newGrid);

doublePickupDropoofLocations(nFactor);

}
```

```java
    private void doublePickupDropoofLocations(int nFactor) {
        for (int i = 0; i < this.dropoffLocations.length; i++) {
            int pt = this.dropoffLocations[i];
            ChessBoardPositionPair pair = this.fromVertexToPair(pt);
            ChessBoardPositionPair newPair = new
ChessBoardPositionPair(nFactor*pair.get_i(), nFactor*pair.get_j());
            int newPt = this.fromPairToVertex(newPair);
            this.dropoffLocations[i] = newPt;
        }
        for (int i = 0; i < this.pickupLocations.length; i++) {
            PickupLocation pickupLocation = this.pickupLocations[i];
            int pt = pickupLocation.location;
            ChessBoardPositionPair pair = this.fromVertexToPair(pt);
            ChessBoardPositionPair newPair = new
ChessBoardPositionPair(nFactor*pair.get_i(), nFactor*pair.get_j());
            int newPt = this.fromPairToVertex(newPair);
            PickupLocation newPickupLocation = new PickupLocation(newPt,
pickupLocation.probabilityOfPickup);
            this.pickupLocations[i] = newPickupLocation;
        }

} void populateMissingObstaclesForDoubleGrid() throws Exception {
        Grid_UPS_SF grid_UPS_SF = (Grid_UPS_SF)this.gridContainer;
        grid_UPS_SF.populateMissingObstaclesForDoubleGrid();
    } private void addPickupLocation(int i, int j, double p, ArrayList<PickupLocation>
pickupLocationsList) {
        ChessBoardPositionPair aChessBoardPositionPair = new ChessBoardPositionPair(i,j);
        PickupLocation aPickupLocation = new
PickupLocation(this.fromPairToVertex(aChessBoardPositionPair), p);
        pickupLocationsList.add(aPickupLocation);
    } boolean isObstacle(ChessBoardPositionPair cell) {
        int val = this.gridContainer.getGrid()[cell.get_i()][cell.get_j()];
        return val < 0;
    }

// 0 for point over WIDE_STREET
    // 0.5 for point over NARROW_STREET(i.e., 2 narrow road crossings is like extending path by 1)
    // 1 for for point over VEGETATION
    // 4 otherwise (Rigid constraint violation!)
    // 2 for other
    protected double getPointPenalty(ChessBoardPositionPair pair) throws Exception {
        int n = gridContainer.getGrid()[pair.get_i()][pair.get_j()];
        ObstacleSF obstacleSF = ((GridSF)gridContainer).obstacleSFFromInt(n);
        if (obstacleSF == ObstacleSF.VEGETATION) return 1.0;
        if (obstacleSF == ObstacleSF.NARROW_STREET) return 0.5;
        if (obstacleSF == ObstacleSF.WIDE_STREET) return 0;
        else return 4; // these are rigid constraint obstacles

}

}
```

```
//@return indexes (in dropoffLocations) of all dropoff locations this path visits, as indexes in
environment_UPS_SF.dropoffLocations
        ArrayList<Integer> getDropoffLocationIndexes(GraphPath path) {
                return getIndexes(dropoffLocations, path);
        }
//@return indexes (in pickupLocations) of all dropoff locations this path visits, as indexes in
environment_UPS_SF.pickupLocations
        ArrayList<Integer> getPickupLocationIndexes(GraphPath path) {
                int[] array = new int[pickupLocations.length];
                for (int i = 0; i < pickupLocations.length; i++) array[i] = pickupLocations[i].location;

return getIndexes(array, path);
        } private ArrayList<Integer> getIndexes(int[] array, GraphPath path) {
                ArrayList<Integer> nRet = new ArrayList<Integer>();
                for (int nPt = 0; nPt < path.len(); nPt++) {
                        int pt = path.get(nPt);
                        int index = containsInLocation(array, pt);
                        if (index >= 0) nRet.add(index);
                }
                return nRet;

}

//@return the index if pt in @param array, or -1 if pt not found in array
        private int containsInLocation(int[] array, int pt) {
                for (int index = 0; index < array.length; index++) {
                        if (pt == array[index]) return index;
                }
                return -1;
        } public static boolean isDropoffLocation(int pt, int[] dropoffLocations) {
                for (int loc: dropoffLocations)
                        if (loc == pt) return true;

return false;
        }
   public static boolean isPickupLocation(int pt, PickupLocation[] pickupLocations) {
                for (PickupLocation pl: pickupLocations)
                        if (pl.location == pt) return true;

return false;

}

}
```

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A method for multiagent pathfinding associated with a domain-of-discourse, the method comprising:
    generating a transition matrix that is n by m, wherein n is a grid size of a domain-of-discourse and m is a number of possible actions taken for a next step from a given step, and wherein the domain-of-discourse is associated with a geographic area;
    generating N potential paths in the domain-of-discourse for each of a plurality of agents, the potential paths associated with an initial agent location and a range of potential final destinations wherein N is larger than n;
    evaluating each potential path with a custom score function to generate a score value for each potential path, the score including a combination of a rigid constraint score, an optimization constraint score, an uncertainty constraint score, and an inter-agent constraint score that represents a corresponding potential path's relationship with paths that were computed for other agents;
    ranking the potential paths by the generated score values, the highest ranked potential paths associated with lower value scores;
    updating the transition matrix, for all agents, with the highest ranked paths of the potential paths;
    in response to iteratively evaluating the highest ranked paths until the highest ranked path score values remain unchanged for a predetermined number of iterations, declaring a highest ranked path of the highest ranked paths, for each agent, as an optimal path; and
    using the optimal path to navigate a vehicle associated with each agent along the highest ranked paths.

2. The method for multiagent pathfinding associated with a domain-of-discourse according to claim 1, wherein the score for each potential path comprises:
    rigid constraint scores that represent the corresponding potential path's ability to satisfy strict requirements;
    optimization constraint scores that represent the corresponding potential path's ability to satisfy routing preferences; and
    uncertainty constraint scores that represent the corresponding potential path's ability to satisfy conditional probabilities.

3. The method for multiagent pathfinding associated with a domain-of-discourse according to claim 1, wherein the method is a based on Cross-Entropy optimization.

4. The method for multiagent pathfinding associated with a domain-of-discourse according to claim 1, wherein the ranking of the potential paths is heavily weighted by the rigid constraint scores.

5. The method for multiagent pathfinding associated with a domain-of-discourse according to claim 1, wherein the custom score function generates the score for each potential path by:
    if one of the strict requirements are not satisfied, adding an unacceptable value to the score of the potential path, wherein the unacceptable value ensures that the potential path will be rejected;
    adding routing nonconformity values to the score based on how closely the potential path satisfies the routing preferences; and
    adding probability of failure values to the score based on predicted outcomes of the conditional probabilities for the potential path.

6. The method for multiagent pathfinding associated with a domain-of-discourse according to claim 1, wherein the rigid constraint scores are associated with one or more of the following rigid constraints:
    (R1) Each agent has a designated start-of-route location, denoted as src, and an end-of-route location, dest;
    (R2) Each agent's route must go through at least $L_{R2}=(L-12)/A$ (A: number of total agents) locations of an L designated drop-off and pickup locations; and
    (R3) Each of the L designated drop-off and pickup locations must be assigned to at least one agent, paths that conform to rigid constraints are called admissible; others are inadmissible, and the method only considers admissible paths.

7. The method for multiagent pathfinding associated with a domain-of-discourse according to claim 1, wherein the optimization constraint scores are associated with one or more of the following optimization constraints:
    (O1) Vehicle routes should be as short as possible;
    (O2) Agents should prefer wide streets; and
    (O3) Two agents should avoid, as much as possible, serving a common drop-off or pickup location.

8. The method for multiagent pathfinding associated with a domain-of-discourse according to claim 1, wherein the uncertainty constraint scores are associated with one or more of the following uncertainty constraints:
    (U1) a "probability of (unannounced) pickup" measure for each pickup location, ploc, denoted as $p_{pickup}(ploc)$, where the later the pickup location is reached during the route, the higher the probability of a pickup being required, and for a given path, a value of stopping at a pickup location, denoted v(ploc), is, therefore, a combination of the product of $p_{pickup}(ploc)$ and the index ploc along the path.

9. A system for multiagent pathfinding associated with a domain-of-discourse, the system comprising:
    a transition matrix generator module generating a transition matrix that is n by m, wherein n is a grid size of a domain-of-discourse and m is a number of possible actions taken for a next step from a given step, and wherein the domain-of-discourse is associated with a geographic area;
    a potential path generator module generating N potential paths in the domain-of-discourse for each of a plurality of agents, the potential paths associated with an initial agent location and a range of potential final destinations wherein N is larger than n;
    an evaluator module evaluating each potential path with a custom score function to generate a score value for each potential path, the score including a combination of a rigid constraint score, an optimization constraint score, an uncertainty constraint score and an inter-agent constraint score that represents a corresponding potential path's relationship with paths that were computed for other agents;
a ranker module ranking the potential paths by the generated score values, the highest ranked potential paths associated with lower value scores;
an updater module updating the transition matrix, for all agents, with the highest ranked paths of the potential paths;
in response to iteratively evaluating the highest ranked paths until the highest ranked path score values remain unchanged for a predetermined number of iterations, declaring a highest ranked path of the highest ranked paths, for each agent, as an optimal path; and
an optimal path communication device communicating the optimal path to each agent to navigate a vehicle associated with each agent along the highest ranked paths.

10. The system for multiagent pathfinding associated with a domain-of-discourse according to claim 9, wherein the score for each potential path comprises:
rigid constraint scores that represent the corresponding potential path's ability to satisfy strict requirements;
optimization constraint scores that represent the corresponding potential path's ability to satisfy routing preferences; and
uncertainty constraint scores that represent the corresponding potential path's ability to satisfy conditional probabilities.

11. The system for multiagent pathfinding associated with a domain-of-discourse according to claim 9, wherein the system performs Cross-Entropy optimization.

12. The system for multiagent pathfinding associated with a domain-of-discourse according to claim 9, wherein the ranking of the potential paths is heavily weighted by the rigid constraint scores.

13. The system for multiagent pathfinding associated with a domain-of-discourse according to claim 9, wherein the custom score function generates the score for each potential path by:
if one of the strict requirements are not satisfied, adding an unacceptable value to the score of the potential path, wherein the unacceptable value ensures that the potential path will be rejected;
adding routing nonconformity values to the score based on how closely the potential path satisfies the routing preferences; and
adding probability of failure values to the score based on predicted outcomes of the conditional probabilities for the potential path.

14. The system for multiagent pathfinding associated with a domain-of-discourse according to claim 9, wherein the rigid constraint scores are associated with one or more of the following rigid constraints:
(R1) Each agent has a designated start-of-route location, denoted as src, and an end-of-route location, dest;
(R2) Each agent's route must go through at least $L_{R2}=(L-12)/A$ (A: number of total agents) locations of an L designated drop-off and pickup locations; and
(R3) Each of the L designated drop-off and pickup locations must be assigned to at least one agent, paths that conform to rigid constraints are called admissible; others are inadmissible, and the method only considers admissible paths.

15. The system for multiagent pathfinding associated with a domain-of-discourse according to claim 9, wherein the optimization constraint scores are associated with one or more of the following optimization constraints:
(O1) Vehicle routes should be as short as possible;
(O2) Agents should prefer wide streets; and
(O3) Two agents should avoid, as much as possible, serving a common drop-off or pickup location.

16. The system for multiagent pathfinding associated with a domain-of-discourse according to claim 9, wherein the uncertainty constraint scores are associated with one or more of the following uncertainty constraints:
(U1) a "probability of (unannounced) pickup" measure for each pickup location, ploc, denoted as $p_{pickup}(ploc)$, where the later the pickup location is reached during the route, the higher the probability of a pickup being required, and for a given path, a value of stopping at a pickup location, denoted v(ploc), is, therefore, a combination of the product of $p_{pickup}(ploc)$ and the index ploc along the path.

17. A system for multiagent pathfinding associated with a domain-of-discourse, the system comprising:
a transition matrix generator module generating a transition matrix that is n by m, wherein n is a grid size of a domain-of-discourse and m is a number of possible actions taken for a next step from a given step, and wherein the domain-of-discourse is associated with a geographic area;
a potential path generator module generating N potential paths in the domain-of-discourse for each of a plurality of agents, the potential paths associated with an initial agent location and a range of potential final destinations wherein N is larger than n;
an evaluator module evaluating each potential path with a custom score function to generate a score value for each potential path, the score including a combination of a rigid constraint score, an optimization constraint score, an uncertainty constraint score and an inter-agent constraint score that represents a corresponding potential path's relationship with paths that were computed for other agents;
a ranker module ranking the potential paths by the generated score values, the highest ranked potential paths associated with lower value scores;
an updater module updating the transition matrix, for all agents, with the highest ranked paths of the potential paths;
in response to iteratively evaluating the highest ranked paths until the highest ranked path score values remain unchanged for a predetermined number of iterations, declaring a highest ranked path of the highest ranked paths, for each agent, as an optimal path; and
an optimal path communication device communicating the optimal path to each agent to navigate a vehicle associated with each agent along the highest ranked paths,
wherein the score for each potential path comprises:
rigid constraint scores that represent the corresponding potential path's ability to satisfy strict requirements;
optimization constraint scores that represent the corresponding potential path's ability to satisfy routing preferences; and
uncertainty constraint scores that represent the corresponding potential path's ability to satisfy conditional probabilities; and
wherein the system performs Cross-Entropy optimization.

18. The system for multiagent pathfinding associated with a domain-of-discourse according to claim 17, wherein the ranking of the potential paths is heavily weighted by the rigid constraint scores.

19. The system for multiagent pathfinding associated with a domain-of-discourse according to claim 17, wherein the custom score function generates the score for each potential path by:
- if one of the strict requirements are not satisfied, adding an unacceptable value to the score of the potential path, wherein the unacceptable value ensures that the potential path will be rejected;
- adding routing nonconformity values to the score based on how closely the potential path satisfies the routing preferences; and
- adding probability of failure values to the score based on predicted outcomes of the conditional probabilities for the potential path.

20. The system for multiagent pathfinding associated with a domain-of-discourse according to claim 17,
wherein the rigid constraint scores are associated with one or more of the following rigid constraints:
- (R1) Each agent has a designated start-of-route location, denoted as src, and an end-of-route location, dest;
- (R2) Each agent's route must go through at least $L_{R2}=(L-12)/A$ (A: number of total agents) locations of an L designated drop-off and pickup locations; and
- (R3) Each of the L designated drop-off and pickup locations must be assigned to at least one agent, paths that conform to rigid constraints are called admissible; others are inadmissible, and the method only considers admissible paths;

wherein the optimization constraint scores are associated with one or more of the following optimization constraints:
- (O1) Vehicle routes should be as short as possible;
- (O2) Agents should prefer wide streets; and
- (O3) Two agents should avoid, as much as possible, serving a common drop-off or pickup location; and wherein the uncertainty constraint scores are associated with one or more of the following uncertainty constraints:
- (U1) a "probability of (unannounced) pickup" measure for each pickup location, ploc, denoted as $p_{pickup}(ploc)$, where the later the pickup location is reached during the route, the higher the probability of a pickup being required, and for a given path, a value of stopping at a pickup location, denoted v(ploc), is, therefore, a combination of the product of $p_{pickup}(ploc)$ and the index ploc along the path.

* * * * *